United States Patent [19]

Major

[11] Patent Number: 5,714,184
[45] Date of Patent: Feb. 3, 1998

[54] BINDER FOR ANIMAL FEED AND PROCESS OF MAKING

[75] Inventor: Billy Major, Sturgeon Falls, Canada

[73] Assignee: 1081107 Ontario Inc., Sturgeon Falls, Canada

[21] Appl. No.: 600,010

[22] Filed: Feb. 14, 1996

[30] Foreign Application Priority Data

Jan. 16, 1996 [CA] Canada ................ 2,167,363

[51] Int. Cl.$^6$ ................................................ A23K 1/12
[52] U.S. Cl. ................ 426/74; 426/512; 426/519; 426/520; 426/615; 426/630; 426/807
[58] Field of Search .................... 426/74, 807, 630, 426/615, 512, 519, 520

[56] References Cited

U.S. PATENT DOCUMENTS

| | | |
|---|---|---|
| 3,401,039 | 9/1968 | Gordon et al. . |
| 3,816,095 | 6/1974 | Bruen et al. . |
| 3,862,337 | 1/1975 | Osborne . |
| 4,323,584 | 4/1982 | Saldien . |
| 4,775,539 | 10/1988 | Van de Walle . |
| 4,857,332 | 8/1989 | Schricker . |
| 4,888,185 | 12/1989 | Miller ........................ 426/807 |
| 4,948,430 | 8/1990 | Banyai et al. . |
| 4,971,820 | 11/1990 | Likuski et al. . |
| 5,227,190 | 7/1993 | Ward . |
| 5,234,701 | 8/1993 | Cummings et al. ........... 426/807 |
| 5,250,714 | 10/1993 | Lajoie . |
| 5,281,434 | 1/1994 | Winowiski . |
| 5,352,340 | 10/1994 | Sweeney . |
| 5,405,628 | 4/1995 | Ueda et al. . |

FOREIGN PATENT DOCUMENTS

| | | |
|---|---|---|
| 1203414 | 3/1983 | Canada . |
| 1314754 | 3/1988 | Canada . |
| 2069156 | 5/1992 | Canada . |
| 1315146 | 3/1993 | Canada . |

*Primary Examiner*—Helen Pratt
*Attorney, Agent, or Firm*—Browdy and Neimark

[57] ABSTRACT

This invention relates the use of sodium carbonate pulping liquor, in liquid or powder form, as a pellet binder in animal feed. The use of sodium carbonate pulping liquor as a binder provides a durable, abrasion resistant pellet that can withstand rough handling without crumbling.

26 Claims, 1 Drawing Sheet

BINDER FOR ANIMAL FEED AND PROCESS OF MAKING

FIELD OF THE INVENTION

The invention is directed to the use of sodium carbonate pulping liquor as a pellet binder in animal feed and is directed to animal feed comprising such a binder.

BACKGROUND OF THE INVENTION

Animal feed is generally produced with low cost by-product ingredients. In particular, animal feed usually comprises binders in varying amounts. One of the drawbacks of using the various low cost by-product ingredients available on the market as binders is that the feed pellets produced as a result are often not durable and cannot withstand rough handling without crumbling to form fines.

Several binders have been introduced in the feed industry in recent years to address this problem. These include various protein colloids, carboxylmethyl cellulose, lignosulfonate-starch blends as well as urea formaldehyde resins. Some of these products provide some improvement in pellet quality.

The present invention relates to the use of sodium carbonate pulping liquor as a binder for animal feed. Sodium carbonate pulping liquor provides a better quality low inclusion feed binder. It is an alternative to the lignosulfonate binders that are the low inclusion binders most commonly used. It has been found that the use of sodium carbonate pulping liquor as a binder does not only result in a durable abrasion resistant pellet that can withstand rough handling but also has the added benefit of being inexpensive. It has the further benefit of providing a use for the sodium carbonate pulping liquor which at the present is in most mills either burnt as fuel or dumped on municipal roads as a dust suppressant.

SUMMARY OF THE INVENTION

The invention relates to the use of sodium carbonate pulping liquor as a pellet binder in animal feed.

The invention further relates to animal feed comprising sodium carbonate pulping liquor as a pellet binder.

BRIEF DESCRIPTION OF THE DRAWING

The invention is further illustrated by the drawing in which.

DETAILED DESCRIPTION OF THE INVENTION

Figure 1:
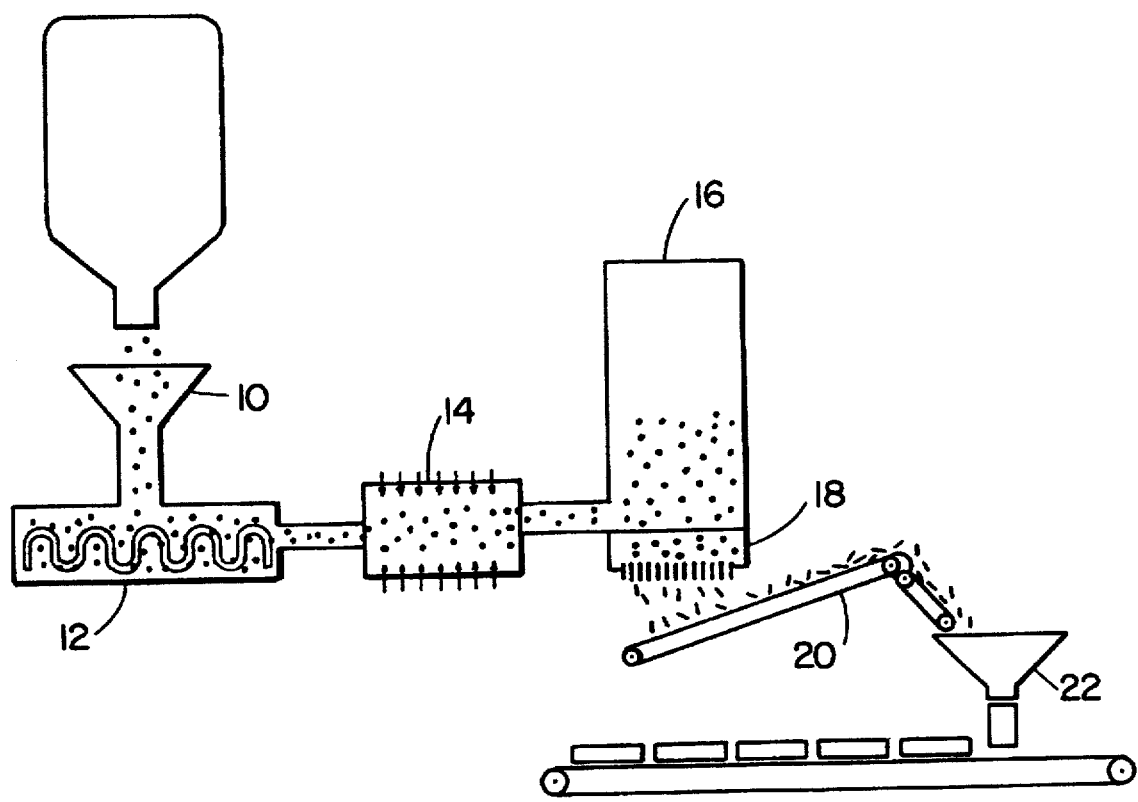
FIG. 1 represents a schematic of the manufacturing process for the preparation of the animal feed pellets of the present invention.

The term "sodium carbonate pulping liquor" as used throughout the specification refers to the spent liquor of a non-sulfur semi-chemical pulping process. It is usually comprised of a mixture of one or more of the following, namely short chain carboxylates, polysaccharides, lignin and lignin breakdown products. It may also include sodium hydroxide where sodium hydroxide is used in the delignification process. The term is not used to refer to a liquor or powder of a specific chemical composition as the chemical composition will vary to a greater or lesser degree depending on the type of wood used and the specific processing conditions.

EXAMPLE 1

Preparation of Sodium Carbonate Pulping Liquor

The sodium carbonate pulping liquor is produced by cooking wood chips in steam at a pressure of 1100 KPA in the presence of a mild solution of sodium carbonate (115 g/l) for about 14 minutes. As a result, the wood chips are softened so that they can be subsequently separated into individual fibres during the refining stage. The wood chips are then compressed to separate the spent sodium carbonate liquor from the wood chips. The separated spent sodium carbonate liquor is evaporated to produce a solution of 45% solids. If the liquor is to be used in dry form, it is then further processed by means of spray drying. The spray dryer dehydrates the sodium carbonate pulping liquor into a free powder having a solids content of about 94% to 96%.

EXAMPLE 2

Feed Preparation a) Using Sodium Carbonate Pulping Liquor in Dry Form

A 200 hp C.P.M. pellet mill, fitted with an appropriate size die and a steam conditioning chamber is used for pelleting. The mill is pre-warmed to 150° F.

The animal feed is prepared by adding to the hopper 10 of the mill at least about 0.3% to 1% of sodium carbonate pulping liquor by weight of feed. In a preferred embodiment, at least about 0.3% to about 1% of sodium carbonate pulping liquor by weight of feed is added. The feed and binder are mixed in the feed and binder mixer 12. The mixture then travels into the conditioning chamber 14 where the heat and steam cause the binder to liquefy and adhere to the feed particles. The feed mixture then travels to the pelleting mill 16 where it is pelleted. The pellets are passed through a pelleting die 18 and travel onto a screen and cooler 20. The pellets are then passed through a bagger 22 and packaged for storage and delivery to customers.

b) Using Sodium Carbonate Pulping Liquor as a Liquid

When feed pellets of the present invention are prepared using the sodium carbonate pulping liquor in liquid form, the same procedure as set out in (a) above is used with the exception that the feed and the pulping liquor are not mixed in the feed and binder mixer 12 but rather the liquid sodium carbonate pulping liquor which has been evaporated to a 45% solids content (as described in Example 1) is injected directly in the conditioning chamber 14. At least about 1% of the pulping liquor by weight of feed is injected in the chamber 14. In a preferred embodiment, at least about 1% to about 2% of the pulping liquor is used.

EXAMPLE 3

Various additives can be added to the sodium carbonate pulping liquor. These include catalysts which will increase the rate of reaction or gel time of the sodium carbonate liquor or any compounds which the liquor to polymerize or become more viscous.

Preferred catalysts include sodium hydroxide, calcium chloride, calcium phosphate, ammonium urea, urea formaldehyde, sodium silicate, hydrated lime, carbon dioxide, magnesium chloride, citric acid, nitric acid, sulphuric acid and phosphoric acid. Preferred polymerization agents or viscosifiers include sodium or calcium bentonite, calcium sulphate, calcium pyrophosphate, calcium phosphite, calcium carbonate, methyl acrylate, polyvinyl alcohol, sodium polyacrylide, sodium polyacrylamide, molasses, corn starch and corn syrup. The pellets prepared with such additives demonstrate the same improved properties i.e. will be more durable and have improved lubrifying properties. An example of pellets prepared with Bentonite is given below in Example 4.

EXAMPLE 4

Comparison of abrasion resistance of the feed pellets of the present invention with pellets prepared without the addition of the sodium carbonate pulping liquor.

To evaluate sodium carbonate pulping liquor as a binding agent for animal feed, tests were conducted where the durability of pellets made without binder, with sodium carbonate pulping liquor, with sodium carbonate pulping liquor and 5% Bentonite (TM) by weight of liquor and with other known feed binders such as Lignobond D.D. and Cra-vis Plus was tested. Test runs were conducted on three feed formulas: Hog-grower, Broiler finisher and Broiler starter.

Feed pellets were produced in the manner described above in Example 2. All binders were -pelleted at the same production rate. Samples were taken 20 and 40 minutes into each run. Additional water was added to the conditioning chamber as needed to optimize pellet quality. Both the sodium carbonate pulping liquor and the sodium carbonate pulping liquor with Bentonite (TM) were tested at a rate of 0.5% and 0.35% per weight of feed, the Lignobond D.D. at a rate of 2.5% per weight of feed and the Cra-vis Plus at a rate of 0.5% per weight of feed.

Data pertaining to the steam conditioning chamber temperature, feeder speed, hot pellet temperature, average amperage and pellet durability was generated and is summarized in the following tables. Utilizing the Kansas State University tumbling method, two ½" nuts were added to the tumbling can for each pellet durability/fines test. According to this method, a representative feed sample is picked after cooling and the fines are screened through a No. 6 screen or sieve. 500 grams of the screened pellets are weighed and placed in a 500 cubic inch tumbling can for 10 minutes at 50 r.p.m. The pellets are removed and the fines screened through a No. 6 screen. The remaining pellets are weighed after tumbling and screening and the percentage of quality pellets calculated as the final weight after tumbling and screening over the original weight placed in the tumbling can.

Table 1 summarizes the tests conducted on pellets made with Hog Grower feed. As explained above, pellets without binder were compared to pellets made with Lignobond D.D. binder, sodium carbonate pulping liquor and sodium carbonate pulping liquor to which Bentonite was added. In the Table, the abbreviation SCPL stands for the sodium carbonate pulping liquor of the present invention.

TABLE 1

Pellets made with Hog Grower Feed

| | Pellet Manufacture and Testing Data | | | | Pellet Mill Control Data | | | |
| --- | --- | --- | --- | --- | --- | --- | --- | --- |
| | | | | | | Motor | | |
| Binder | Binder/ Ton | Initial Wt | Final Wt | P.D.I. % | T° (°F.) | Load (amp) | Steam | TPH |
| None | Nil | 500 g | 442 g | 88.4 | 185 | 65 | 40 | 5 |
| Lignobond DD | 25 kg | 500 g | 491 g | 98.2 | 195 | 57 | 44.2 | 6.5 |
| SCPL | 5 kg | 500 g | 493.4 g | 98.7 | 190 | 56 | 45 | 6.4 |
| SCPL + Bentonite | 5 kg | 500 g | 494 g | 98.8 | 195 | 55 | 45 | 6.5 |

P.D.I. = pellet durability improvement
TPH = tonnes per hour

The same tests as summarized above in Table 1 were conducted on pellets made with Broiler Finisher feed.

TABLE 2

Pellets made with Broiler Finisher Feed

| Binder | Pellet Manufacture and Testing Data | | | | Pellet Mill Control Data | | | |
|---|---|---|---|---|---|---|---|---|
| | Binder/ Ton | Initial Wt | Final Wt | P.D.I. % | T° (°F.) | Motor Load (amp) | Steam | TPH |
| None | Nil | 500 g | 423.4 g | 84.7 | 183 | 63 | 38 | 5 |
| Lignobond DD | 25 kg | 500 g | 482 g | 96.4 | 192 | 55 | 44 | 5 |
| SCPL | 3.5 kg | 500 g | 480 g | 96 | 191 | 55 | 45 | 5 |
| SCPL + Bentonite | 3.5 kg | 500 g | 484 g | 96.8 | 190 | 56 | 45 | 5 |

The same tests as summarized above were conducted on pellets made with Broiler Starter feed. Instead of using Lignobond D.D. binder, Cra-Vis Plus binder was used for comparison purposes. These resulst are summarized in Table 3 below.

TABLE 3

Pellets made with Broiler Starter Feed

| Binder | Pellet Manufacture and Testing Data | | | | Pellet Mill Control Data | | | |
|---|---|---|---|---|---|---|---|---|
| | Binder/ Ton | Initial Wt | Final Wt | P.D.I. % | T° (°F.) | Motor Load | Steam | TPH |
| None | Nil | 500 g | 415 g | 83 | 182 | 64 | 39 | 5 |
| Cra-Vis Plus | 5 kg | 500 g | 487 g | 97.4 | 191 | 56 | 45 | 6.5 |
| SCPL | 5 kg | 500 g | 487 g | 97.4 | 192 | 55 | 47 | 6.5 |
| SCPL + Bentonite | 5 kg | 500 g | 487.6 g | 97.5 | 191 | 56 | 46 | 6.5 |

As can be seen from a review of the test results of Tables 1 to 3, the use of sodium carbonate pulping liquor or sodium carbonate pulping liquor with Bentonite (TM) substantially reduced the amount of fines and increased the pellet durability.

While the present invention has been described in connection with specific embodiments thereof and in specific uses, various modifications of the invention will occur to those skilled in the art without departing from the spirit and the scope of the invention as set forth in the appended claims. I therefore wish to embody within the scope of the patent which may be granted hereon all such embodiments as reasonably and properly come within the scope of my contribution to the art.

The preferred embodiments in which an exclusive property or privilege is claimed are defined as follows:

1. A process for preparing pelleted animal feed, using sodium carbonate pulping liquor as a binder comprising:
   (i) treating wood chips in the presence of a mild solution of sodium carbonate to obtain said sodium carbonate pulping liquor;
   (ii) combining said sodium carbonate pulping liquor with said animal feed;
   (iii) heating the combined sodium carbonate pulping liquor and animal feed;
   (iv) pelleting the product of step (iii).

2. The process of claim 1 wherein the step (i) of treating the wood chips in the presence of a mild solution of sodium carbonate includes cooking said wood chips in steam.

3. The process of claim 2 wherein said step of cooking in steam is performed at a pressure of about 1100 KPA.

4. The process of claim 2 wherein said sodium carbonate is present within the mild solution used in step (i) at a concentration of about 115 g/l.

5. The process of claim 2 wherein the sodium carbonate pulping liquor produced in step (i) is then concentrated to provide a solution comprising about 45% solids.

6. The process of claim 2 wherein the sodium carbonate pulping liquor produced in step (i) is then concentrated to provide a powder comprising from about 94 to 96% solids.

7. The process of claim 1 wherein the step of combining comprises adding from about 0.3% to 1% of said sodium carbonate pulping liquor by weight of feed.

8. The process of claim 1 wherein the step (ii) of combining comprises adding from about 1 to 2% of said sodium carbonate pulping liquor by weight of feed.

9. The process of claim 1 wherein the step (ii) of combining involves direct injection of said sodium carbonate pulping liquor onto said animal feed.

10. The process of claim 1 wherein at least one catalyst is added to said sodium carbonate pulping liquor produced in step (i).

11. The process of claim 10 wherein said catalyst is selected from the group consisting of sodium hydroxide, calcium chloride, calcium phosphate, ammonium urea, urea formaldehyde, sodium silicate, hydrated lime, carbon dioxide, magnesium chloride, citric acid, nitric acid, sulphuric acid, and phosphoric acid.

12. An animal feed prepared by the process of claim 11.

13. The process of claim 1 wherein at least one of a polymerizing agent or viscosifier is added to the sodium carbonate pulping liquor.

14. The process of claim 13 wherein said polymerizing agent or viscosifier is selected from the group consisting of sodium bentonite, calcium bentonite, calcium sulphate, calcium pyrophosphate, calcium phosphite, calcium carbonate, methyl acrylate, polyvinyl alcohol, sodium polyacrylide, sodium polyacrylamide, molasses, corn starch, and corn syrup.

15. An animal feed prepared by the process of claim 14.

16. An animal feed prepared by the process of claim 1.

17. A process for preparing pelleted animal feed, using sodium carbonate pulping liquor as a binder comprising:
   (i) providing a sodium carbonate pulping liquor obtained by treating wood chips in the presence of a mild solution of sodium carbonate, at a concentration of about 115 g/l, and cooking said wood chips in steam at a pressure of about 1100 KPA to obtain said sodium carbonate pulping liquor;
   (ii) combining from about 0.3% to 2% of said sodium carbonate pulping liquor by weight of animal feed, with said animal feed;
   (iii) heating the combined sodium carbonate pulping liquor and animal feed;
   (iv) pelleting the product of step (iii).

18. The process of claim 17 wherein the sodium carbonate pulping liquor is provided in a form concentrated to a solution comprising about 45% solids.

19. The process of claim 17 wherein the sodium carbonate pulping liquor is provided in a form concentrated to a powder comprising from about 94 to 96% solids.

20. The process of claim 17 wherein at least one catalyst has been added to said sodium carbonate pulping liquor.

21. The process of claim 20 wherein said catalyst is selected from the group consisting of sodium hydroxide, calcium chloride, calcium phosphate, ammonium urea, urea formaldehyde, sodium silicate, hydrated lime, carbon dioxide, magnesium chloride, citric acid, nitric acid, sulphuric acid, and phosphoric acid.

22. An animal feed prepared by the process of claim 21.

23. The process of claim 17 wherein at least one of a polymerizing agent or viscosifier has been added to the sodium carbonate pulping liquor.

24. The process of claim 23 wherein said polymerizing agent or viscosifier is selected from the group consisting of sodium bentonite, calcium bentonite, calcium sulphate, calcium pyrophosphate, calcium phosphite, calcium carbonate, methyl acrylate, polyvinyl alcohol, sodium polyacrylide, sodium polyacrylamide, molasses, corn starch, and corn syrup.

25. An animal feed prepared by the process of claim 24.

26. An animal feed prepared by the process of claim 17.

* * * * *